United States Patent
Butler et al.

(10) Patent No.: US 7,913,485 B2
(45) Date of Patent: Mar. 29, 2011

(54) DUAL MODE PROPULSION SYSTEM

(75) Inventors: William M. Butler, Fort Worth, TX (US); Paul E. Hagseth, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1025 days.

(21) Appl. No.: 11/678,696

(22) Filed: Feb. 26, 2007

(65) Prior Publication Data

US 2009/0320442 A1    Dec. 31, 2009

Related U.S. Application Data

(60) Provisional application No. 60/779,827, filed on Mar. 7, 2006.

(51) Int. Cl.
*B63H 11/00* (2006.01)
(52) U.S. Cl. .......................................... 60/221; 440/45
(58) Field of Classification Search .............. 60/221, 60/222, 204; 440/22, 44, 45
See application file for complete search history.

(56) References Cited

U.S. PATENT DOCUMENTS

| | | | | |
|---|---|---|---|---|
| 2,720,367 A | * | 10/1955 | Doolittle | 244/1 R |
| 2,972,974 A | * | 2/1961 | Follett | 114/280 |
| 3,092,060 A | * | 6/1963 | Reid | 114/313 |
| 3,121,414 A | * | 2/1964 | Peterson | 114/272 |
| 3,411,301 A | * | 11/1968 | Olsen | 60/221 |
| 3,614,024 A | * | 10/1971 | Millman | 244/2 |
| 5,344,345 A | | 9/1994 | Nagata | |
| 5,598,700 A | | 2/1997 | Varshay et al. | |
| 6,349,538 B1 | | 2/2002 | Hunter, Jr. et al. | |
| 6,439,503 B1 | | 8/2002 | Winfree et al. | |
| 6,662,549 B2 | | 12/2003 | Burns | |

OTHER PUBLICATIONS

Bohachevsky, I. O., et al.; Pulsed Hydrojet Propulsion; AIAA-85-1416; American Institute of Aeronautics and Astronautics, Jul. 1985, Monterey, CA.

Yungster, S., et al., Multiple-Cycle Simulation of a Pulse Detonation Engine Ejector, NASA/TM-2002-211888; OCOMP-2002-05; AIAA-2002-3630; Oct. 2002.

\* cited by examiner

*Primary Examiner* — Michael Cuff
*Assistant Examiner* — Phutthiwat Wongwian
(74) *Attorney, Agent, or Firm* — Bracewell & Giuliani LLP

(57) ABSTRACT

A system or method of propelling a vehicle with a multimodal propulsion system is provided. This multimodal propulsion system includes a primary inlet, a high-pressure gas generator, a gas generator exhaust system, a secondary fluid inlet, and a propulsion exhaust system. The primary inlet receives an incoming fluid flow that is provided to the high-pressure gas generator. The high-pressure gas generator coupled to the primary inlet produces a high-pressure exhaust from the incoming fluid flow. The high-pressure gas generator exhaust and secondary inlet couple to the propulsive exhaust system which mixes the two flow streams. The secondary flow may be gaseous or liquid fluid flow such as air flow for airborne flight and water for waterborne operation. The mixed fluid flow is expelled by the propulsive exhaust system that can propel the vehicle.

16 Claims, 9 Drawing Sheets

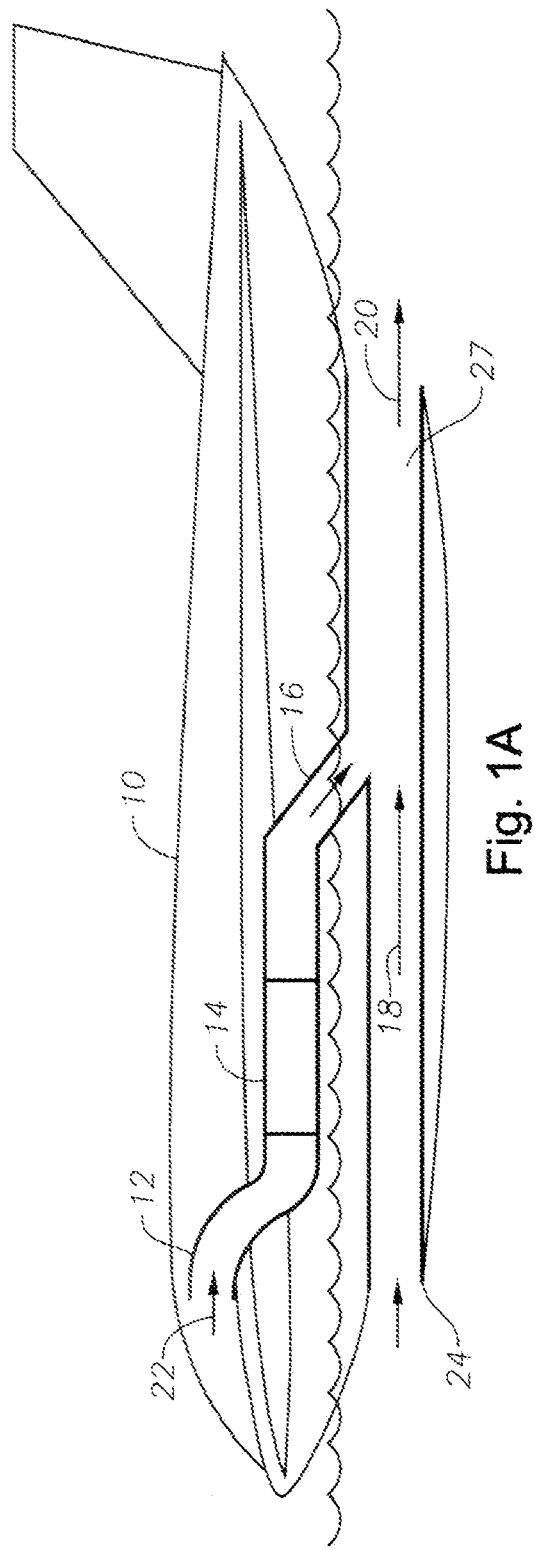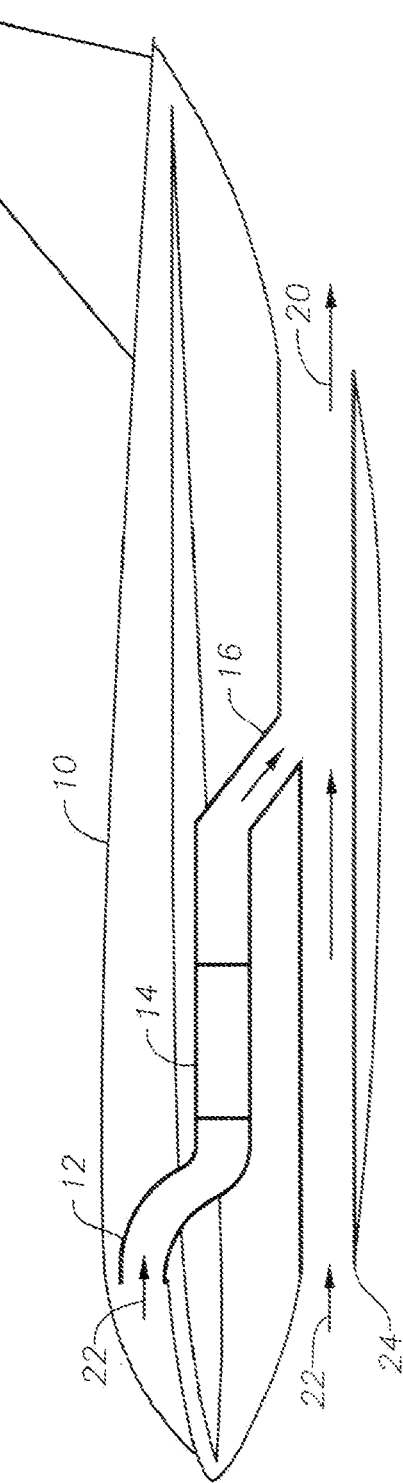

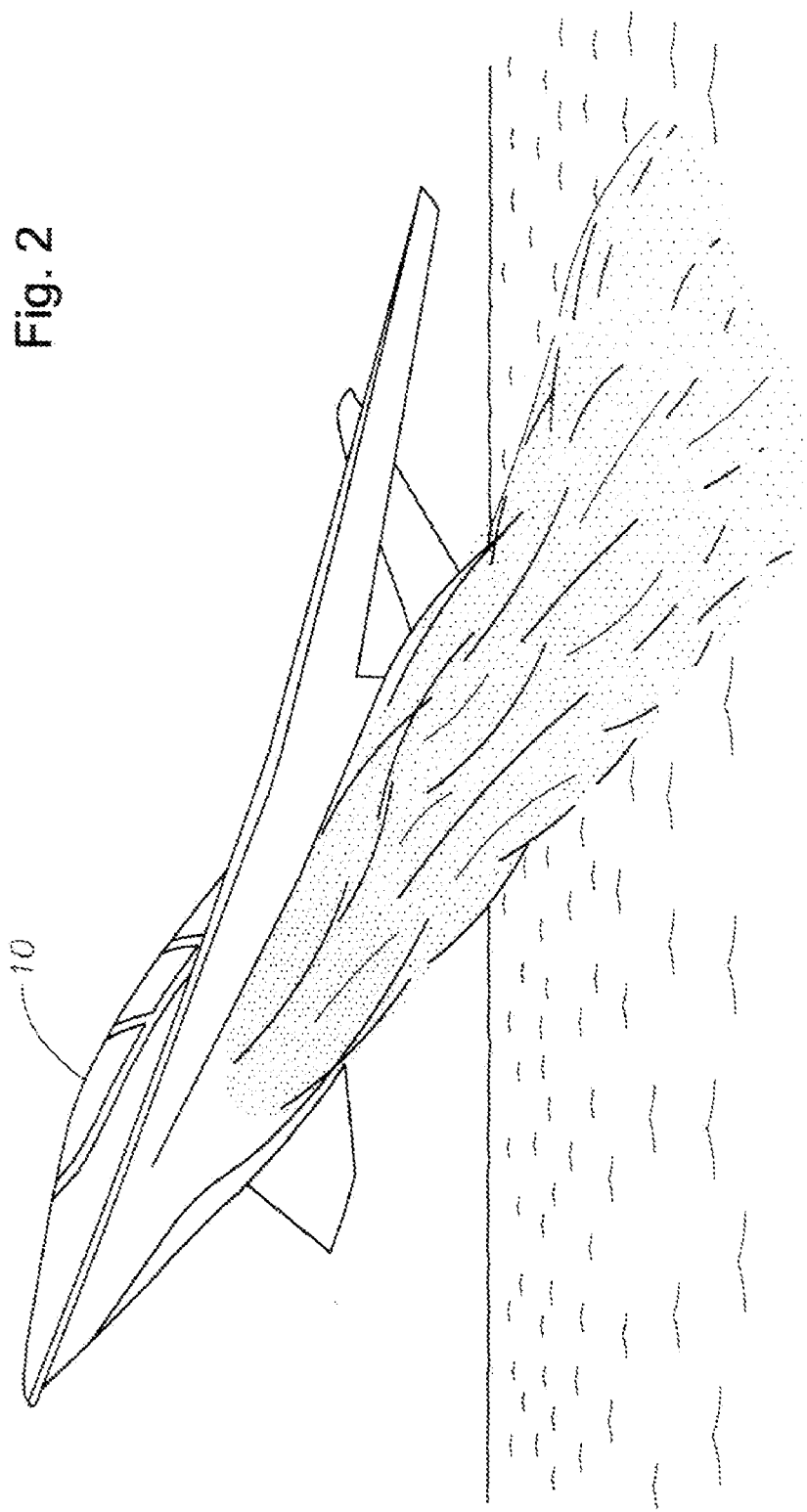

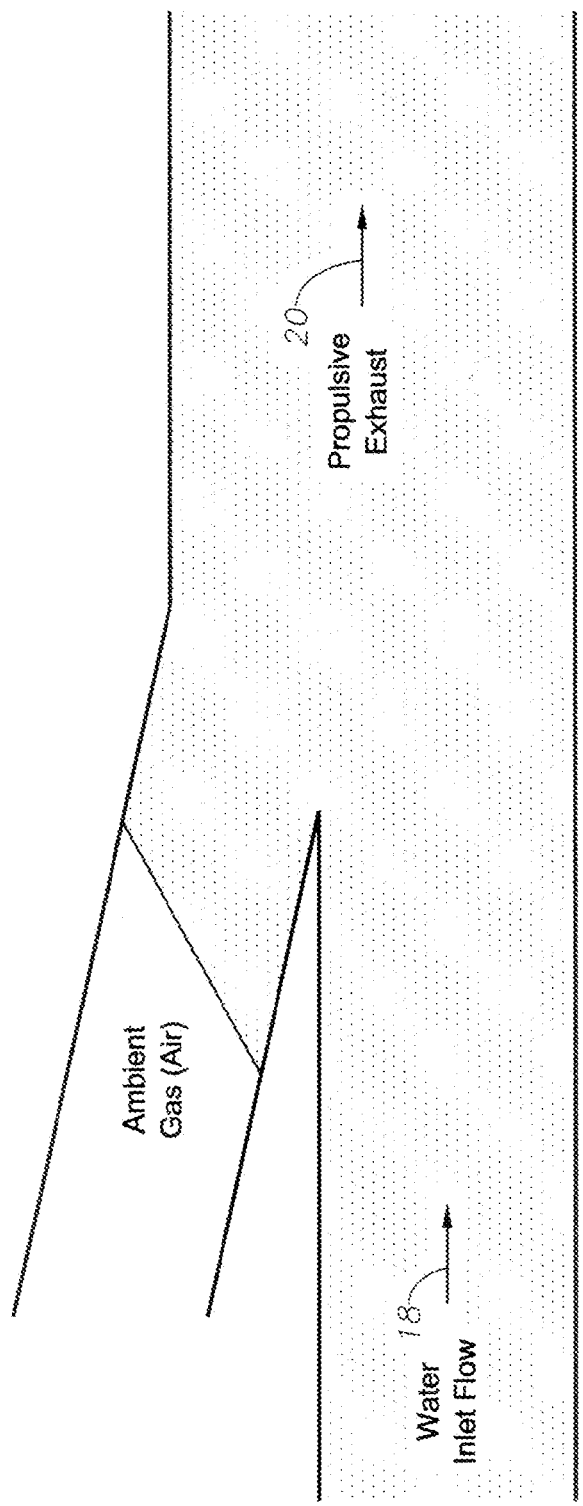

DUAL MODE PROPULSION SYSTEM

RELATED APPLICATIONS

This application claims priority to and incorporates by reference in its entirety for all purposes U.S. Provisional Application No. 60/779,827 filed on 7 Mar. 2006 Dual Mode (Aero/Hydro) Propulsion System" to William Micheal Butler.

TECHNICAL FIELD OF THE INVENTION

The present invention relates generally to vehicle propulsive systems and methods, and more particularly, a system and method to provide vehicle propulsion to vehicles that operate in liquid and gaseous environments.

BACKGROUND OF THE INVENTION

At present, air vehicles that have seafaring capability only use the water as a landing platform. They have limited utility as seagoing vessels and generally only carry propulsion that is capable of efficient use during flight. Thus vehicles such as helicopters and seaplanes can only fly out and hover over points over the water for very limited durations or can land in the water but only operate in a very limited range/manner while at sea.

There are two types of seaplanes: the floatplane and the flying boat. A floatplane has pontoons mounted under the fuselage. Only the "floats" of a floatplane normally come into contact with water. The fuselage remains above water. Some small land aircraft can be modified to become float planes. In a flying boat, the main source of buoyancy is the fuselage, which acts much like a ship's hull in the water. Most flying boats have small floats mounted on their wings to keep them stable. These amphibious aircraft can often take off and land both on conventional runways and water. A true seaplane can only take off and land on water. Similarly helicopters may use floats or their hull to provide buoyancy. These helicopters like seaplanes can only take off and land on water.

Seaplanes can only take off and land on water with little or no wave action and, like other aircraft, have trouble in extreme weather. The size of waves a given design can withstand depends on, among other factors, the aircraft's size, hull or float design, and its weight. Flying boats can typically handle rougher water and are generally more stable than floatplanes while on the water.

In either case, these amphibious aircraft rely on propulsion systems best suited to flight. This propulsion system provides only limited functionality on the water's surface. For example, the vehicle may be limited to merely taxiing on the water's surface since the propulsion system typically provided operates efficiently as an aircraft and not as a seafaring vehicle. Typical single propulsion systems limit the ability of the vehicle to perform a number of duties such as, but not limited to, search and rescue, surveillance and law enforcement.

SUMMARY OF THE INVENTION

Embodiments of the invention provide a solution that substantially addresses the limitations of the prior art and other problems with a dual mode propulsion system that combines attributes of both a high pressure gas generator and a hydrojet engine. Such an engine allows for efficient operation in flight as an aircraft and enables a very capable seafaring vehicle during water operations. The propulsion is integrated into an amphibious vehicle that allows more robust and efficient vehicle capabilities by permitting seafaring vehicles to remain on station for long durations and return to base quickly, depending on conditions and location. This "long loiter" capability can be highly applicable to a range of tactical missions including search and rescue, logistics support, and surveillance.

Embodiments of the present invention provide a Dual Mode (Aero/Hydro) propulsion system and method that substantially eliminates or reduces disadvantages and problems associated with previously developed systems. These embodiments enable a vehicle to operate efficiently both as an aircraft and as a seafaring (waterborne) vehicle. A single propulsion system propels a vehicle in flight and in the water. The unique use of a high pressure gas generator and dual mode ejector nozzle may enable both high speed atmospheric and waterborne operation. Such capability will enable a vehicle to perform a number of tactical duties such as search and rescue, surveillance and law enforcement.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIGS. 1A and 1B depict waterborne operation and airborne operation of a vehicle having a propulsion system in accordance with an embodiment of the present invention mention ejector;

FIG. 2 depicts a vehicle having an aerodynamic/hydrodynamic propulsion system that enables a vehicle to operate efficiently both as an aircraft or a water borne vehicle in accordance with an embodiment of the present invention;

FIG. 3 depicts a vehicle propulsion system in a waterborne non-propulser state in accordance with an embodiment of the present invention;

DESCRIPTION OF THE INVENTION

Figure 4:
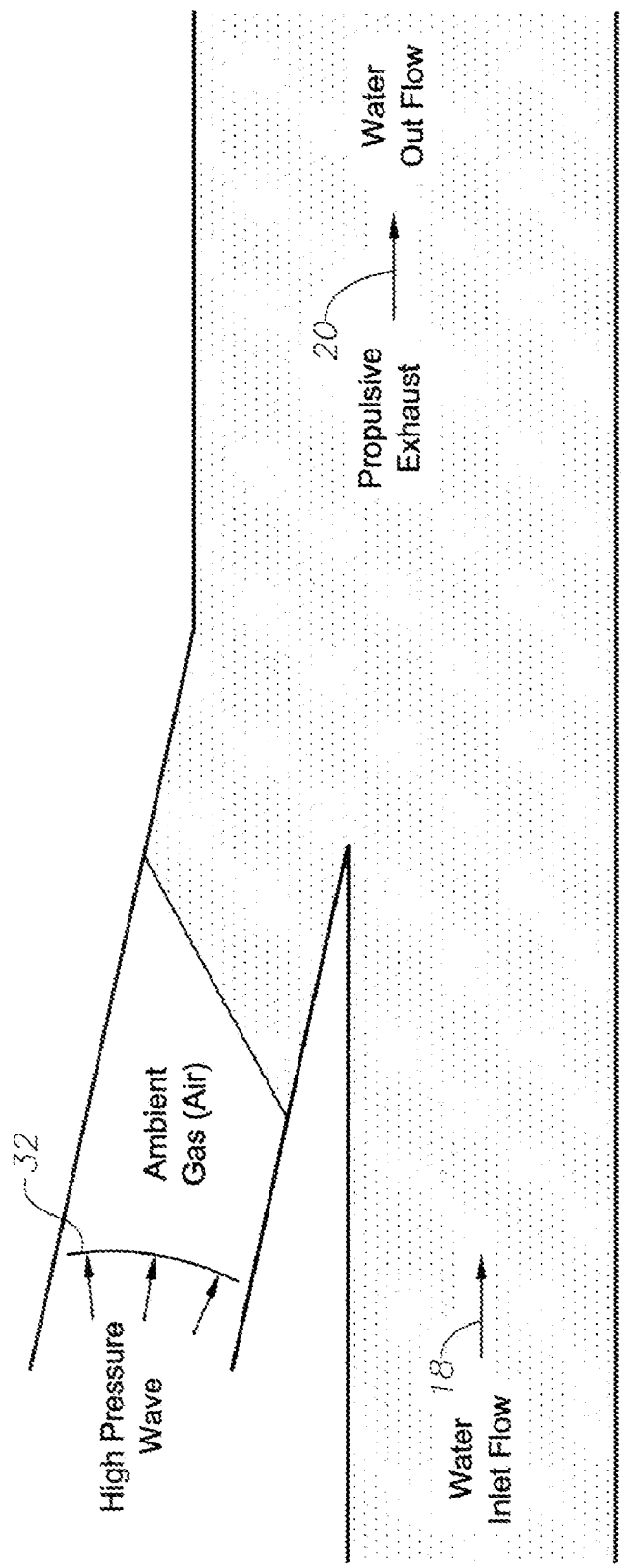
FIG. 4 depicts the flow paths of a vehicle propulsion system during waterborne operation where high pressure gas is generated and ejected into the water flow of a propulsion system in accordance with an embodiment of the present invention.

Preferred embodiments of the present invention are illustrated in the figures, like numerals being used to refer to like and corresponding parts of the various drawings.

The dual mode propulsion system provided by embodiments of the invention enables vehicles to operate efficiently both as an aircraft and as a seafaring vehicle. A single propulsion system propels the vehicle in flight and on the water. The unique use of a high pressure gas generator (such as but not limited to a gas turbine, pulsejet or pulse detonation engine (PDE)) enables high speed operation in both the air (e.g., at potentially supersonic speeds) and in the water. Such capability enables a vehicle to perform a number of missions such as, but not limited to, search and rescue, surveillance and law enforcement.

The dual mode propulsion concept utilizes a high pressure gas generator and dual inlets that feed into a single exhaust or nozzle. One inlet is an air intake that feeds into a high pressure gas generator. This inlet is in operation whenever the vehicle is operating under its own power in the air or at sea. A second inlet is used for water intake during waterborne operations or air intake during airborne operations of the vehicle. During airborne operations, the gas generator exhausts to a nozzle and out into air/free stream.

For waterborne operations, exhaust products from the gas generator are combined with water that may be aerated, where the water is received through the second (water) intake. Embodiments that use a PDE, may secure some chambers of the PDE, as only part of the total high pressure gas generator thrust capability is required. Aeration may be included to help the high pressure, high temperature gas generator exhaust to mix with the water or other like fluid and provides for a more efficient momentum energy transfer. The high pressure gas generator exhaust/secondary fluid (e.g. water) mixture moves through a mixing region which may be convergent, divergent or substantially straight, is ejected out the back of the vehicle through the common nozzle, thus creating propulsive force. The nozzle or exhaust may have a variable geometry to allow for optimized operation. This nozzle could also be vectored to permit directional control of the propulsive force. The dual mode propulsion system essentially operates as an ejector during waterborne operations, where the high pressure gas generator exhaust is the "motive fluid" or secondary fluid to the water which is the primary fluid. The concept is similar to a waterjet without the use of moving parts such as impellers. The figures in the next section further illustrate this dual mode (Aero/Hydro) concept.

The total air breathing operation has been demonstrated having specific fuel consumption (SFC) values of approximately 1.0 to 2.2. The former are for high by-pass flows and the latter is for max power conditions where all the air entering the engine goes through the combustion process. This is similar to the afterburner operation of a gas turbine engine where all the oxygen is burned.

The waterborne mode of operation introduces high pressure and/or high temperature air to water flow to form a propulsive device for a marine vessel.

FIGS. 1A and 1B depict waterborne operation and airborne operation, respectively, of a vehicle having a propulsion system in accordance with an embodiment of the present invention. In FIG. 1A, gas ingested through gas generator inlet 12 of vehicle 10 and supplied to gas generator 14 to produce an exhaust 16. This high pressure gas generator exhaust 16 mixes with water flow 18 to produce a propulsive exhaust 20. In FIG. 1B, airborne operations are shown where gas generator inlet 12 receives an incoming airflow 22 which is supplied to the gas generator 14. The exhaust 16 of gas generator 14 mixes with airflow to produce a propulsive exhaust 20.

One embodiment of such a propulsion system includes an air intake inlet 12, a high pressure gas generator 14 and a gas generator exhaust system 16 which feeds into a propulsive exhaust which may operate in conjunction with a second inlet 24, which may be open for waterborne operations and optionally open for airborne operations. During waterborne operations, airflow 22 is drawn through air intake 12 to gas generator 14 where the exhaust feeds into a single nozzle 27. During waterborne or seafaring operations, a second inlet 24 may open to receive water flow 18 which the exhaust of gas generator 14 mixes to produce a propulsive exhaust 20.

FIG. 1B illustrates airborne operations where air is received through air intake or gas generator inlet 12 and provided to high pressure gas generator 14 and produces a gas generator exhaust 16 which may or may not mix with a second airflow 22, depending on whether or not the second intake 24 is open to provide inlet airflow. The high pressure gas generator exhaust 16 may produce a propulsive exhaust 20 during airborne operations with or without the secondary inlet airflow 22.

FIG. 2 depicts a vehicle having a dual mode (aerodynamic/hydrodynamic) propulsion system that enables a vehicle to operate efficiently both as an aircraft or a waterborne vehicle in accordance with an embodiment of the present invention. Here, vehicle 10 is shown in an airborne mode of operation. This vehicle may transition from hydrodynamic to aerodynamic propulsion as illustrated in FIG. 2.

FIGS. 3 through 6 illustrate how the high pressure gas generator may be used to produce a propulsive exhaust during waterborne operations. FIG. 3 depicts the flow paths of a vehicle propulsion system during steady state, non-propulsing flow in accordance with an embodiment of the present invention. During steady state, non-propulsive flow as shown in FIG. 3, a high pressure gas generator is not producing sufficient exhaust pressure so as to result in a propulsive exhaust. Thus, water flow 18 is unaffected by the output of the high pressure gas generator.

FIG. 4 depicts the flow paths of a vehicle propulsion system during waterborne operation where high pressure gas is generated and ejected into the water flow of a propulsion system in accordance with an embodiment of the present invention. Here, the output of the gas generator produces a high pressure wave 32 within the ambient gas and is ejected into inlet water flow 18. This high pressure wave impinges on the water or fluid flow as shown in FIG. 5.

Figure 5:
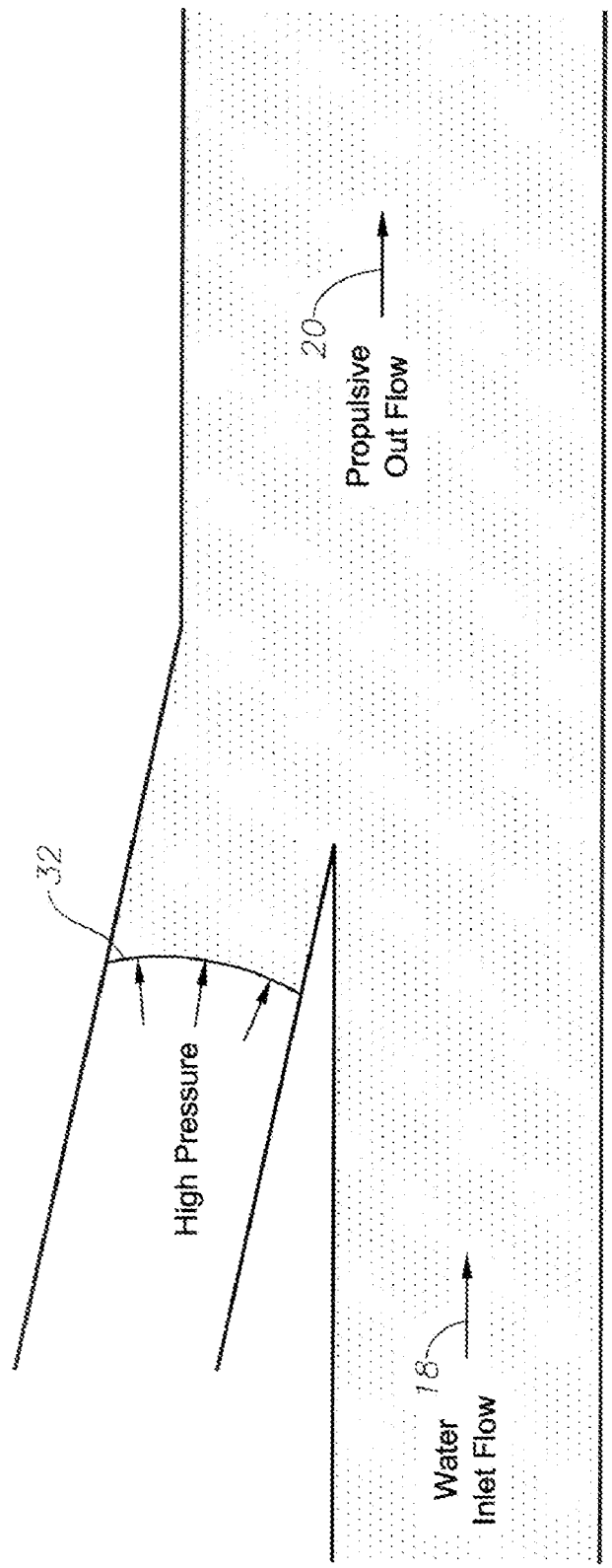
FIG. 5 depicts the flow paths of a vehicle propulsion system where high pressure gas impinges on a fluid to create propulsive force during waterborne operations of a vehicle in accordance with an embodiment of the present invention.
Figure 6:
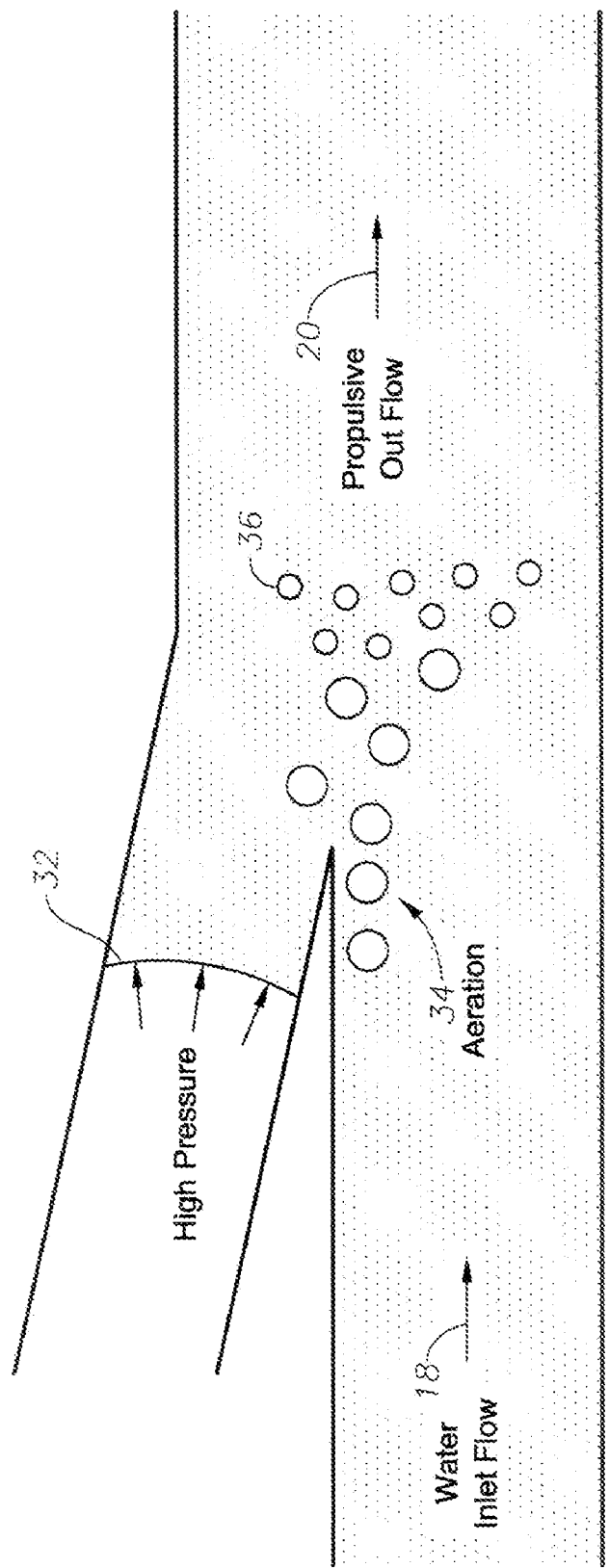
FIG. 6 depicts how aeration within the flow paths of a vehicle propulsion system may increase propulsive efficiency of waterborne operations in accordance with an embodiment of the present invention.

FIG. 5 depicts the flow paths of a vehicle propulsion system where high pressure gas impinges on a fluid to create propulsive force during waterborne operations of a vehicle in accordance with an embodiment of the present invention. As the high pressure gas 32 impinges on the water or fluid, a propulsive force is created. Here, high pressure exhaust of gas generator 14 impinges on water from inlet flow 18 in order to produce propulsive outflow 20. FIG. 6 depicts aeration within the flow paths of a vehicle propulsion system. Aeration may increase propulsive efficiency of waterborne operations in accordance with an embodiment of the present invention. Additionally, aeration 34 may be introduced upstream of the introduction of the high pressure gas generator exhaust 32 in order to increase the propulsive efficiency of the propulsive outflow.

Figure 7:
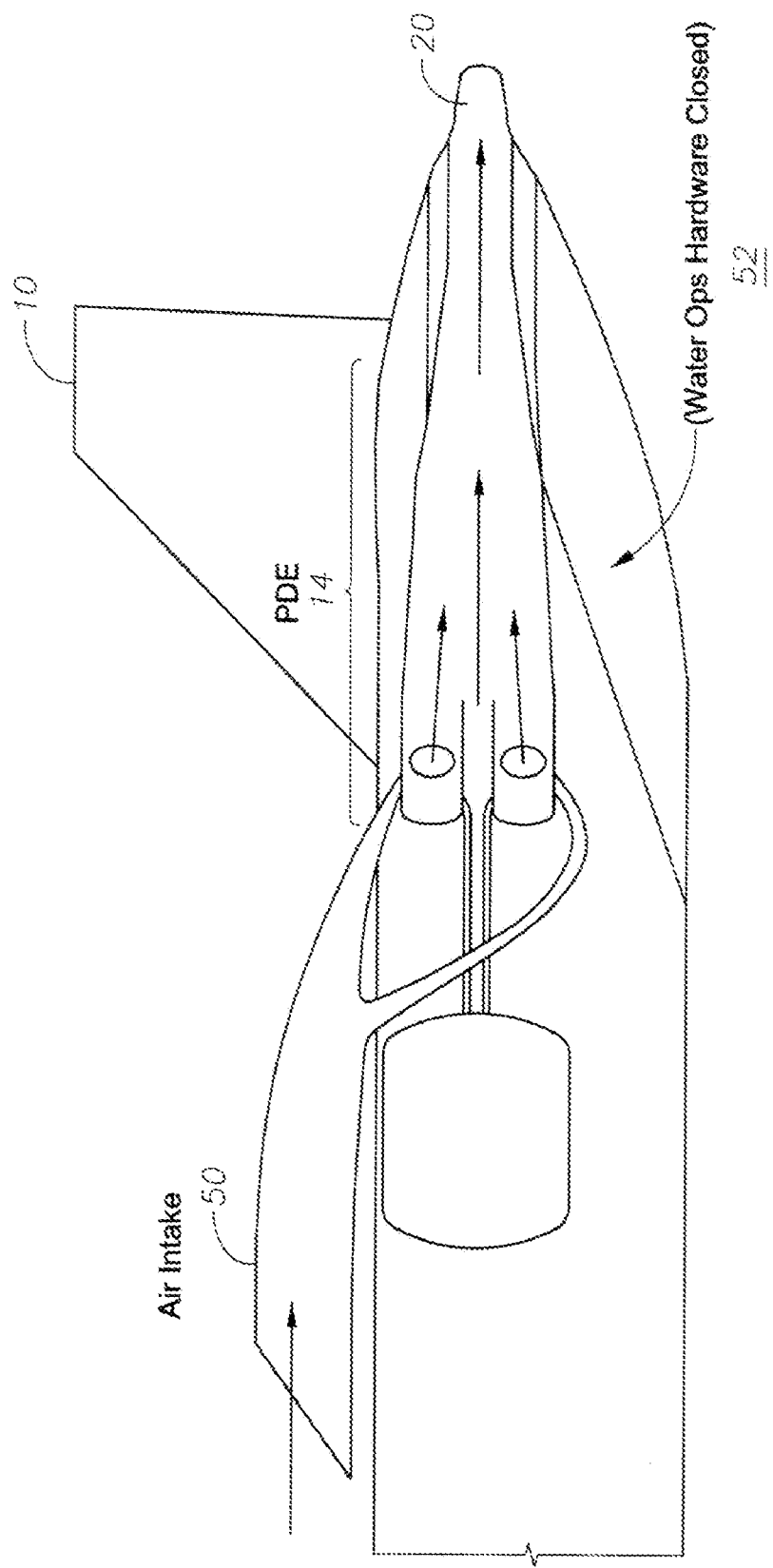
FIG. 7 depicts provides a cross-section of a vehicle having a propulsion system in accordance with an embodiment of the present invention operating in an airborne or atmospheric configuration.
Figure 8:
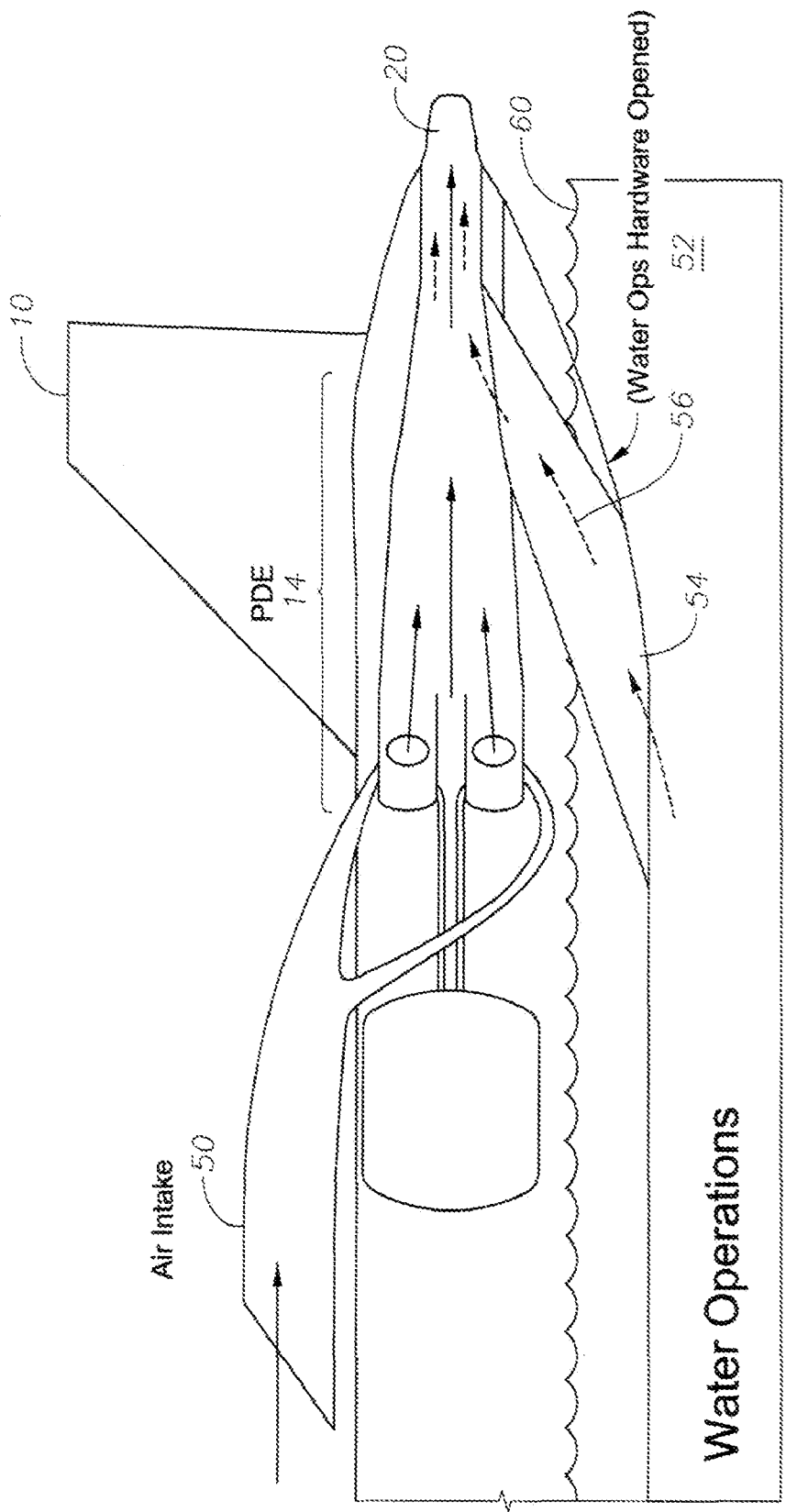
FIG. 8 depicts provides a cross-section of a vehicle having a propulsion system in accordance with an embodiment of the present invention operating in a waterborne or seafaring configuration.

FIGS. 7 and 8 depict an embodiment of the present invention in which the secondary inlet is open or closed (secured) during different modes of operation. FIG. 7 provides a cross-section of a vehicle having a propulsion system in accordance with an embodiment of the present invention operating in an airborne or atmospheric configuration. During airborne operations, vehicle 10 as shown may ingest air through air intake 50 which is supplied to a gas generator 14, which in this case may be a PDE. During airborne operations, the water inlet and associated hardware 52 is secured. Air ingested through air intake 50 is operated on by the PDE to produce propulsive exhaust 20.

FIG. 8 depicts provides a sectional view of a vehicle having a propulsion system in accordance with an embodiment of the invention operating in a waterborne or seafaring configuration. Here, vehicle 10 is shown partially submerged at a water/air interface 60. Again air is ingested through air intake 50 and operated on a gas generator 14. However, for waterborne operations, the waterborne hardware 52 is open to ingest water which the exhaust water receives through inlet 54 as water flow 56. The exhaust of the gas generator 14 impinges on the water received through the water inlet and operated on in order to produce a combined propulsive exhaust 20.

Figure 9:
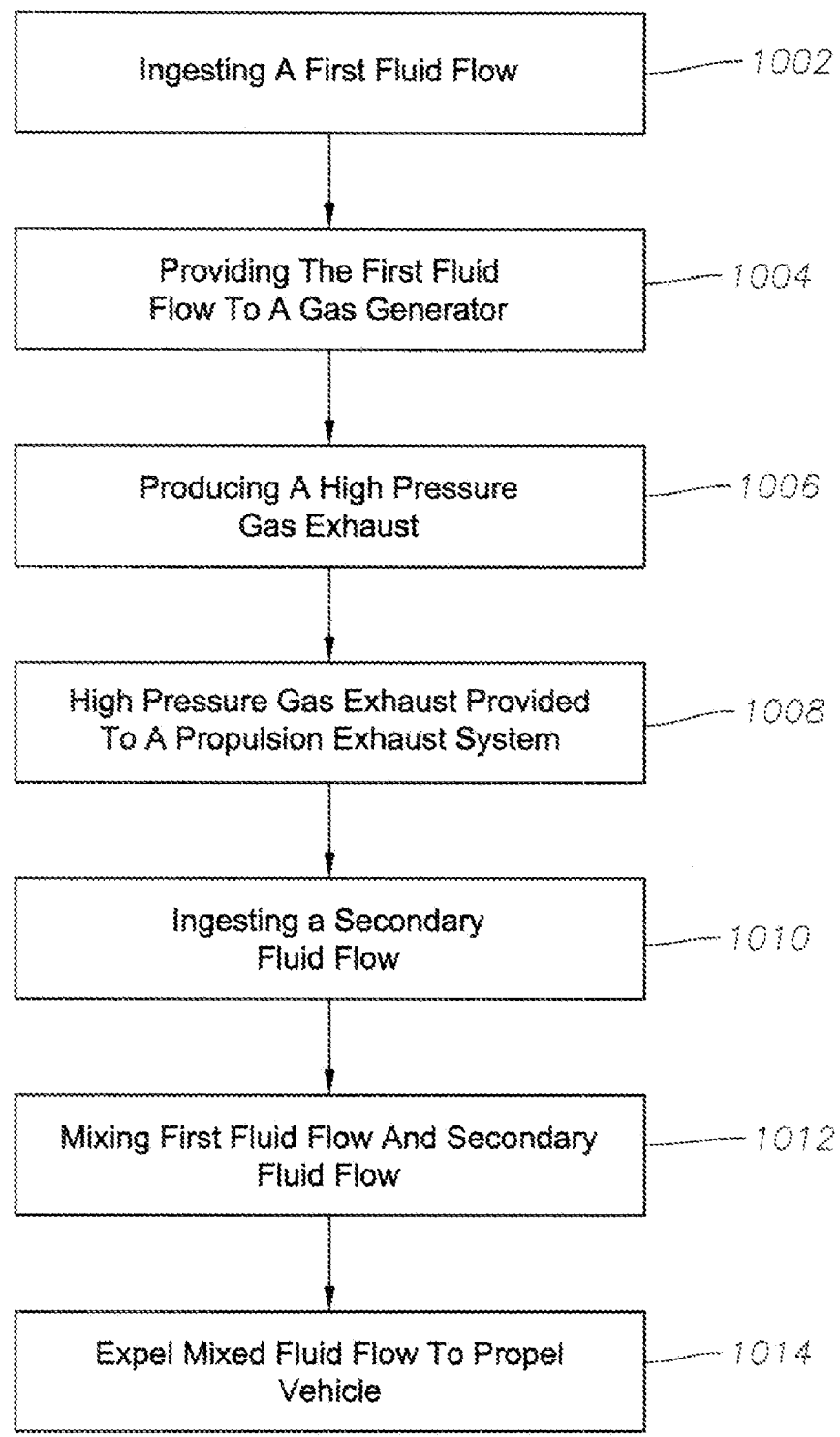
FIG. 9 provides a logic flow diagram illustrating a method of propelling a vehicle with a multimodal propulsion system in accordance with embodiments of the present invention.

FIG. 9 provides a logic flow diagram illustrating a method of propelling a vehicle with a multimodal propulsion system in accordance with embodiments of the present invention. Operations 1000 begin with step 1002. In step 1002 a first fluid flow is ingested. In step 1004 the first fluid flow is provided to the gas generator. The gas generator produces a high-pressure gas exhaust in step 1006. This gas generator may be a gas turbine, pulsejet, single or multi unit PDE or other like device. In step 1008 the high-pressure gas exhaust is provided to a propulsion exhaust system. The high-pressure gas exhaust may then be expelled by the propulsion exhaust system in a first mode of operation. In a second mode of operation the secondary fluid flow is ingested using a secondary inlet in step 1010. Then the secondary fluid flow and high-pressure gas exhaust produced by the gas generator mix in step 1012. In step 1014 the mixed fluid flow is expelled to propel the vehicle. This may include the vectoring of the mixed fluid flow.

Recent studies of sea-basing, coastal patrol, and law enforcement operations have indicated a strong need for fast timely operations in a marine environment. Along with this need is a desire to be able to respond to land based situations from the sea. Legacy systems are typically designed to operate from either water or land bases, but not both. Water surface based systems are usually heavy and relatively slow. Airborne systems typically require large infrastructures such as runways or helipads which have especially large impacts to sea-based forces.

Embodiments of the present invention combine two proven technologies into a single unique application that may have a high potential to provide the capabilities described above. This concept combines a primary intake, high pressure gas generator and secondary intake into a single system and that uses a common ejector chamber and nozzle. In the airborne mode, the vehicle uses the high pressure gas generator in its classic mode of operation with the primary intake feeding air to the high pressure gas generator and the high pressure gas generators exhaust being directed into an ejector where it is combined with air form the secondary inlet and exhausted out of the nozzle. During waterborne operations, the high pressure gas generator is operated in the same manner, but its high pressure, high energy exhaust is directed into a stream of water that enters through the secondary intake. The combined fluids are entrained in the ejector, and the high energy, high velocity mixture is exhausted out of the nozzle. This mode of operation is an essence an ejector with high pressure gas generator exhaust serving as the motive fluid and water serving as the secondary fluid.

When combined with morphing structures technologies, embodiments of the present invention may provide a vehicle able to operate on the water in up to moderate sea states. The vehicle will not be just a "seaplane" that lands on the water and taxis, but instead will function as a true seafaring vessel capable of sustained sea operations. When the need arises, the vehicle will be able to take-off and fly as an aircraft capable of reaching longer distances over land or water in less time than those that can be achieved by watercraft alone. It is believed that such vehicles could serve many tactical roles including logistics support, search and rescue, surveillance and law enforcement.

Once the vehicle is in the water, the wings may be folded to stabilize the vehicle in the water and move it out of the way for more efficient operations. This transformation in the wing is accomplished through the use of morphing technology. The applicable technologies primarily comprise unique and innovative actuators and flexible materials that enable new dimensions and capabilities in variable geometry concepts. Morphing allows not only the wing shape to be optimized, but also allows the fuselage to be optimized for water operations. These technologies include morphing skins, piezoelectrics actuators, and articulating hinge structures.

The craft provided by embodiments of the present invention may be able to stay on the water for days and function much like any other boat driven by a waterjet. The dual mode propulsion system will allow the vehicle to travel slowly (around 10 kts) and move up to speeds of 30 to 40 kts if needed, airborne operations could be used when appropriate such as to reach more distant or inland locations quickly or for aerial patrol missions. Thus a single craft could stay at sea in search and rescue missions and in law enforcement while at the same time have the capability to take-off to reach a land based destination in a matter of minutes.

Embodiments of the present invention combine two well understood propulsion concepts, a high pressure gas generator and a flow ejector. Air enters the intake and is directed to the high pressure gas generator that has valves in the open position. The air is then mixed with fuel that is injected into the chamber and the valves close. A detonation is initiated and the detonation moves through the mixture of fuel and air. The mixture of Shockwave and detonated fuel/air is high pressure and fills the chamber. These products travel down the chamber and exit. As these products exit, valves open again and the next influx of air is drawn in by the lower pressure region that exists behind the shockwave and combustion products and the process begins again.

When the vehicle functions as an airborne vehicle under high pressure gas generator propulsion, the exhaust products are directed out of the nozzle. The ejector allows an efficient waterborne propulsion system. Water enters the water intake and travels down the intake and is infused with bubbles of ducted high pressure gas generator exhaust. Here the high pressure gas generator exhaust impacts and forces entrainment of the water. This makes the fluid more amenable to mixing and momentum exchange that occurs downstream. These combined products have a higher energy state and are compressed and expanded in a venturi until they exit. Embodiments of the present invention provide a concept that combines these two systems into one, thus theoretically allowing one to develop an efficient air/sea vehicle. It is felt that the reduced number of moving parts that exists in a high pressure gas generator will allow for a more reliable engine than a traditional gas turbine engine. The inherent design of the high pressure gas generator allows us to have a single nozzle instead of two that would be required for a gas turbine engine in this application.

The key feature of a high pressure gas generator is the highly unsteady and very high pressure exhaust flow it generates. This unsteady high pressure flow is highly conducive to mixing, Ejectors are very common in aircraft engine nozzle applications, primarily to entrain additional flow to provide cooling and/or fill an otherwise over expanded nozzle. Ejectors are less common for water applications. A primary challenge of ejectors for applications involving thrust enhancement is to obtain proper mixing of the flows. Steady primary flows such as from steam sources or gas turbine engines are very steady and thus do not readily mix with the secondary flow.

Embodiments of the present invention utilize the highly unsteady and energetic flow of the high pressure gas generator to enhance mixing in the ejector to generate thrust for any type of secondary flow such as air or water for airborne or waterborne (or water surface) applications. High pressure gas generator exhaust pressures are typically 4 to 7 times higher than the inlet air pressure, thus a high pressure gas generator operating at typical sea level conditions generates exhaust pressures that fluctuate from near zero up to 500 psia at a frequency of up to 40 hz, this compares with the steady flow at up to 25 psia that are typical of other gas generators. The high pressure gas generator thus offers a much greater ability to mix with the secondary ejector flow than is possible with any other type of gas generator system.

In summary, embodiments of the invention provide a system, method and apparatus for propelling a vehicle with a multimodal propulsion system. This multimodal propulsion system includes a first air inlet, a high pressure gas generator, a secondary fluid inlet, and a propulsion exhaust system. The first air inlet receives an incoming airflow that is provided to the high pressure gas generator. The high pressure gas generator coupled to the first air inlet produces a high pressure exhaust from the incoming airflow. The high pressure gas generator exhaust and secondary inlet couple to the propulsive exhaust system which mixes the two flow streams. The mixed fluid flow is expelled by the propulsive exhaust system that can propel the vehicle. Another embodiment provides a method of propelling a vehicle with a propulsion system having multiple modes of operation. This method involves ingesting the first airflow with a first fluid inlet. The first fluid flow is provided to a high pressure gas generator. This high pressure gas generator produces a high pressure gas exhaust which may be used to directly propel the vehicle during a first mode of operations. A secondary fluid flow may be ingested with a secondary fluid inlet during a second mode of operation. The secondary fluid flow may be mixed with the high pressure gas exhaust during the second mode of operation. The secondary fluid flow may be aerated during the second mode of operation. This first mode of operation may normally be thought of as an airborne mode of operation. The second mode of operation may be either a waterborne or airborne mode of operation. Such that the secondary fluid flow may be either a gaseous flow in airborne modes of operation or a liquid flow in a waterborne mode of operation. The propulsion exhaust system may expel the mixed fluid flow to propel the vehicle. This may include vectoring the mixed fluid flow with a variable geometry nozzle or other like device.

Although the present invention is described in detail, it should be understood that various changes, substitutions and alterations can be made hereto without departing from the spirit and scope of the invention as described by the appended claims.

What is claimed is:

1. A vehicle propulsion system, comprising:
    a first fluid intake operable to receive a first fluid flow;
    a high pressure gas generator operably coupled to the first fluid intake, the high pressure gas generator producing a high pressure exhaust;
    a gas generator exhaust system operable to expel the high pressure exhaust to a propulsive exhaust system; and
    a secondary inlet to provide a secondary fluid flow, the secondary fluid flow mixes mixing with the high pressure exhaust within the propulsive exhaust system, wherein the secondary inlet may be secured during an operation, wherein the secondary inlet provides a secondary airflow during airborne operation and wherein the secondary inlet provides a secondary water flow during waterborne operation.

2. The vehicle propulsion system of claim 1, wherein the propulsion exhaust system comprises:
    a mixing region through which high pressure exhaust and inlet secondary flow mix within the propulsive exhaust system; and
    a common exhaust nozzle, wherein the common exhaust nozzle expels the mixed high pressure exhaust and inlet secondary flow.

3. The vehicle propulsion system of claim 2, wherein the mixing region is convergent flow areas, divergent flow areas, substantially constant flow area, or any combination of these flow areas.

4. The vehicle propulsion system of claim 2, wherein the common exhaust nozzle comprises a variable geometry nozzle, wherein the common exhaust nozzle is operable to vector the mixed high pressure exhaust and inlet secondary flow and/or vary the flowpath geometry.

5. The vehicle propulsion system of claim 1, wherein the high pressure gas generator comprises at least one gas turbine, pulsejet and pulse detonation engine (PDE), and wherein at least one chamber of said at least one gas turbine, pulsejet and PDE may be secured during the second mode of operations.

6. The vehicle propulsion system of claim 1, wherein aeration enhances mixing in the propulsive exhaust system and aeration may be obtained from the gas generator exhaust.

7. A vehicle propulsion system, comprising:
    a first intake operable to receive an incoming airflow;
    a high pressure gas generator operably coupled to the first intake, the high pressure gas generator producing a high pressure exhaust;
    a gas generator exhaust system operable to expel the high pressure exhaust to a propulsive exhaust system; and
    a secondary inlet to provide an inlet water flow during waterborne operations, the inlet water flow mixes with the high pressure exhaust within the propulsive exhaust system during waterborne operations, wherein the secondary inlet provides a secondary airflow during airborne operation.

8. The vehicle propulsion system of claim 7, wherein the secondary inlet may be secured during air airborne operation.

9. The vehicle propulsion system of claim 7, wherein aeration enhances mixing in the propulsive exhaust system and aeration may be obtained from the gas generator exhaust.

10. The vehicle propulsion system of claim 7, wherein the propulsion exhaust system comprises:
    a mixing region through which the mixed high pressure exhaust and inlet water flow mix within the propulsive exhaust system; and
    a common exhaust nozzle, wherein the common exhaust nozzle expels the mixed high pressure exhaust and inlet water flow.

11. The vehicle propulsion system of claim 10, wherein the mixing region has convergent flow areas, divergent flow areas, substantially constant flow area, or any combination of these flow areas.

12. The vehicle propulsion system of claim 10, wherein the common exhaust nozzle comprises a variable geometry nozzle operable to vector the mixed high pressure exhaust and inlet water flow and vary the flowpath geometry.

13. A method of propelling a vehicle with a dual mode propulsion system, comprising:
  ingesting an airflow with a first inlet;
  providing the airflow to a high pressure gas generator;
  producing a high pressure gas exhaust with the high pressure gas generator, the high pressure gas exhaust propels the vehicle during airborne operation;
  ingesting a water flow with a secondary inlet during waterborne operation;
  ingesting the airflow with the secondary inlet during the airborne operation and mixing the water flow with the high pressure gas exhaust during the water borne operation, wherein the mixed water flow and the high pressure gas exhaust propel the vehicle during the waterborne operation.

14. The method of claim 13, wherein a mixing region in which high pressure exhaust and a secondary inlet fluid flow mix; and a common exhaust nozzle, wherein the common exhaust nozzle expels the mixed high pressure exhaust and the secondary inlet fluid flow.

15. The method of claim 13, wherein the secondary inlet may be secured during the airborne operation.

16. The method of claim 13, wherein the high pressure gas generator comprises at least one gas turbine, pulsejet and pulse detonation engine (PDE), and wherein at least one chamber of said at least one gas turbine, pulsejet and PDE may be secured during the second mode of operations.

* * * * *